(12) United States Patent
Hoffman et al.

(10) Patent No.: US 6,640,240 B1
(45) Date of Patent: Oct. 28, 2003

(54) METHOD AND APPARATUS FOR A DYNAMIC CACHING SYSTEM

(75) Inventors: David M. Hoffman, San Jose, CA (US); Sudhir Mohan, Saratoga, CA (US); Manish Gulati, San Jose, CA (US); Nicholas J. Woods, Santa Clara, CA (US); Umesh R. Patil, San Jose, CA (US)

(73) Assignee: Pivia, Inc., Cupertino, CA (US)

( * ) Notice: Subject to any disclaimer, the term of this patent is extended or adjusted under 35 U.S.C. 154(b) by 0 days.

(21) Appl. No.: 10/143,716

(22) Filed: May 9, 2002

Related U.S. Application Data

(63) Continuation-in-part of application No. 09/312,308, filed on May 14, 1999, now Pat. No. 6,505,230.

(51) Int. Cl.⁷ .............................................. G06F 13/00
(52) U.S. Cl. ...................................................... 709/203
(58) Field of Search ................................. 709/200, 202, 709/203, 213; 711/118, 126, 133, 147; 725/48

(56) References Cited

U.S. PATENT DOCUMENTS 6,253,234 B1 * 6/2001 Hunt et al. ................. 709/213
6,374,404 B1 * 4/2002 Brotz et al. ................... 725/46

* cited by examiner

*Primary Examiner*—Robert B. Harrell
(74) *Attorney, Agent, or Firm*—Blakely, Sokoloff, Taylor & Zafman LLP

(57) ABSTRACT

A method and apparatus for providing a dynamic caching system is described. The apparatus for dynamic caching comprises a UCI creator to create a unique content identifier for a request for a requested data set, proxy receiving logic to receive the requested data set from the origin server, and a compilation engine to create a compile object from the requested data set. The apparatus further comprises an assembly engine to, on a subsequent request for the data set, interpret the compile object to create the requested data set. The apparatus further comprises a response logic to serve the requested data set to a requester, without impacting the origin server.

30 Claims, 16 Drawing Sheets

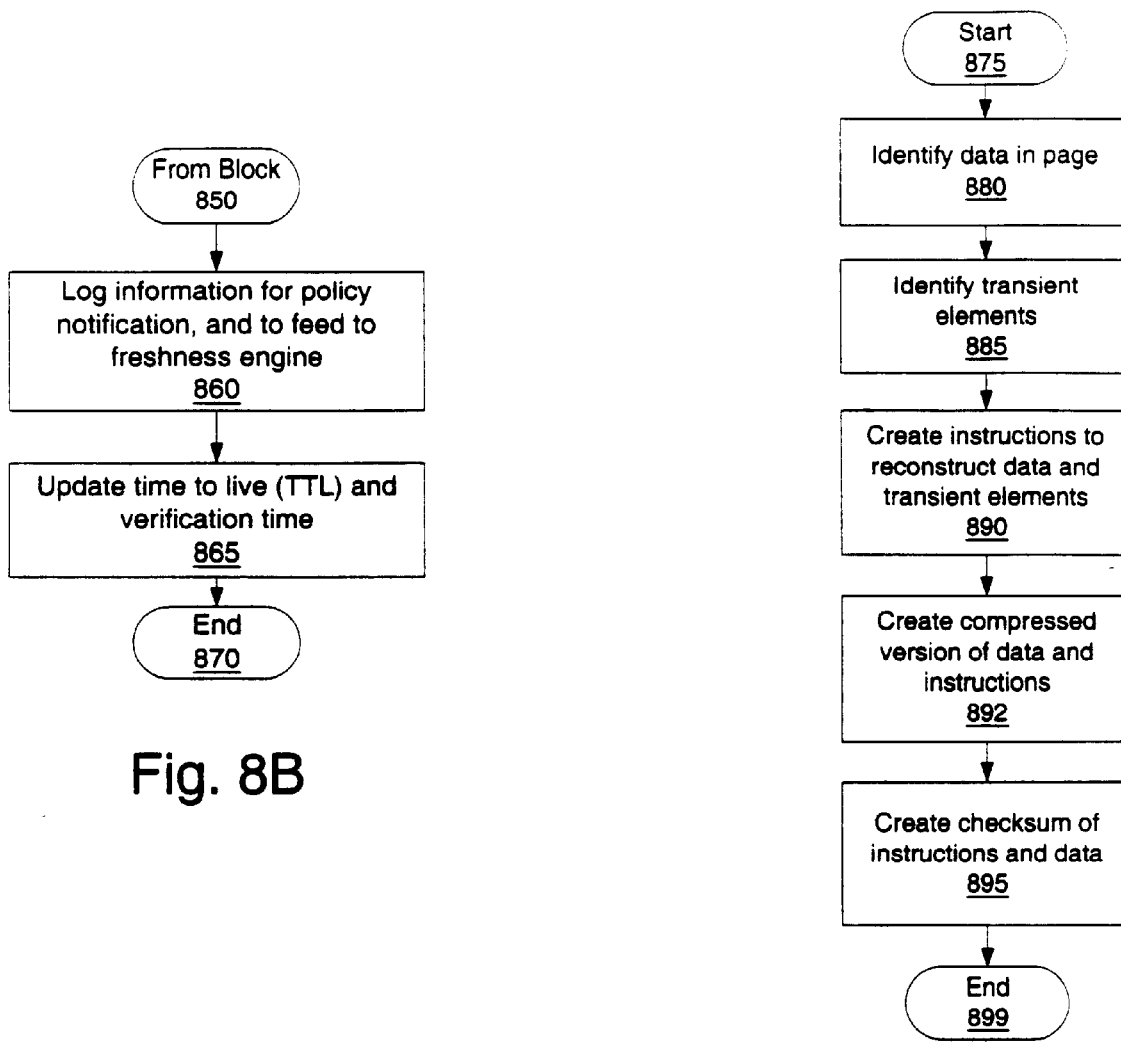

METHOD AND APPARATUS FOR A DYNAMIC CACHING SYSTEM

RELATED CASES

The present application is a Continuation-in-Part of U.S. patent application Ser. No. 09/312,308, filed May 14, 1999, entitled "Client-Server Independent Intermediary Mechanism", now U.S. Pat. No. 6,505,230.

FIELD OF THE INVENTION

The present invention relates-to caching, and more specifically, to caching dynamic content.

BACKGROUND

The competition among web applications on the Internet is continuing to increase. To provide economic value, web applications must offer content that is current, compelling, targeted to user interests and needs, and rich in information. Accordingly, web sites are providing dynamic content to meet such demands. However, as web sites transition from static to dynamic content, the business tension between the need for improved website performance and sky-rocketing costs of web operations continues to mount. In particular, many web sites face the challenge of expanding to include more personalized, dynamic content, improving performance, while simultaneously reducing the costs of web operations. The explosion of dynamic content, personalization and more sophisticated content management applications is significantly increasing the value of each web site browsing experience. However, such features for a web site are also bogging down backend systems, thereby creating performance, scaling, and cost headaches.

A current approach to such problems includes a never-ending build-out of additional servers and software. In addition to the new capital equipment, such an approach typically requires hiring of extra staff to manage the new web infrastructure.

Another typical approach to such problems includes conventional caches that store and retrieve copies of static objects, such as bitmaps and pictures. However, because web sites are gravitating to more dynamic content, conventional caches are not able to cache most web pages. Furthermore, many web pages include content such as personalized information, and transient data, which cannot be cached by conventional systems. Therefore, the conventional caches used cannot be used for much of the content.

SUMMARY OF THE INVENTION

A method and apparatus for dynamic caching is described. A method and apparatus for providing a dynamic caching system is described. The apparatus for dynamic caching comprises a UCI creator to create a unique content identifier for a request for a requested data set, proxy receiving logic to receive the requested data set from the origin server, and a compilation engine to create a compile object from the requested data set. The apparatus further comprises an assembly engine to, on a subsequent request for the data set, interpret the compile object to create the requested data set. The apparatus further comprises response logic to serve the requested data set to a requester, without impacting the origin server.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 8A and 8B are flowcharts of one embodiment of handling data served by the data server.

FIG. 8C is a flowchart of one embodiment of compiling a page to create a compile object.

DETAILED DESCRIPTION

A method and apparatus for a dynamic caching system is described. The dynamic caching system includes two portions, the inline server and the offline server. The inline server is fast and responds to user requests. The offline server is used to calculate the time to live of objects, as well as to permit user's policy setting.

The inline server receives requests directed to an origin server. The dynamic caching system creates a unique content identifier (UCI) for the request. The UCI includes relevant parameters. Then, based on the UCI, the system determines whether the requested data exists in the cache, and is fresh. If so, the data is served from the cache. Transient content—e.g. content that changes with every response, such as ads and personalization—is placed within the served data automatically. If the data is not fresh, or not in the cache, it is fetched from the origin server and served to the requester. The data fetched from the origin server is compiled, to form a compile object, which can be used to reconstruct the original data. The compile object includes two portions, data and instructions. The data is the "static" content, while the instructions indicate how to assemble the data and insert any transient content required. The compile object is compared with the version in the cache, if there is one. For one embodiment, a CRC of the compile object is compared with the CRC of the cached version. For one embodiment, the CRC is part of the metadata kept about the object in the cache. The new data is compared to the old data, and this information is passed to the offline server. The offline server generates a function to determine the time-to-live. The comparison information along with the function generated by the offline server is used to recalculate the object's time to live.

Figure 1A:
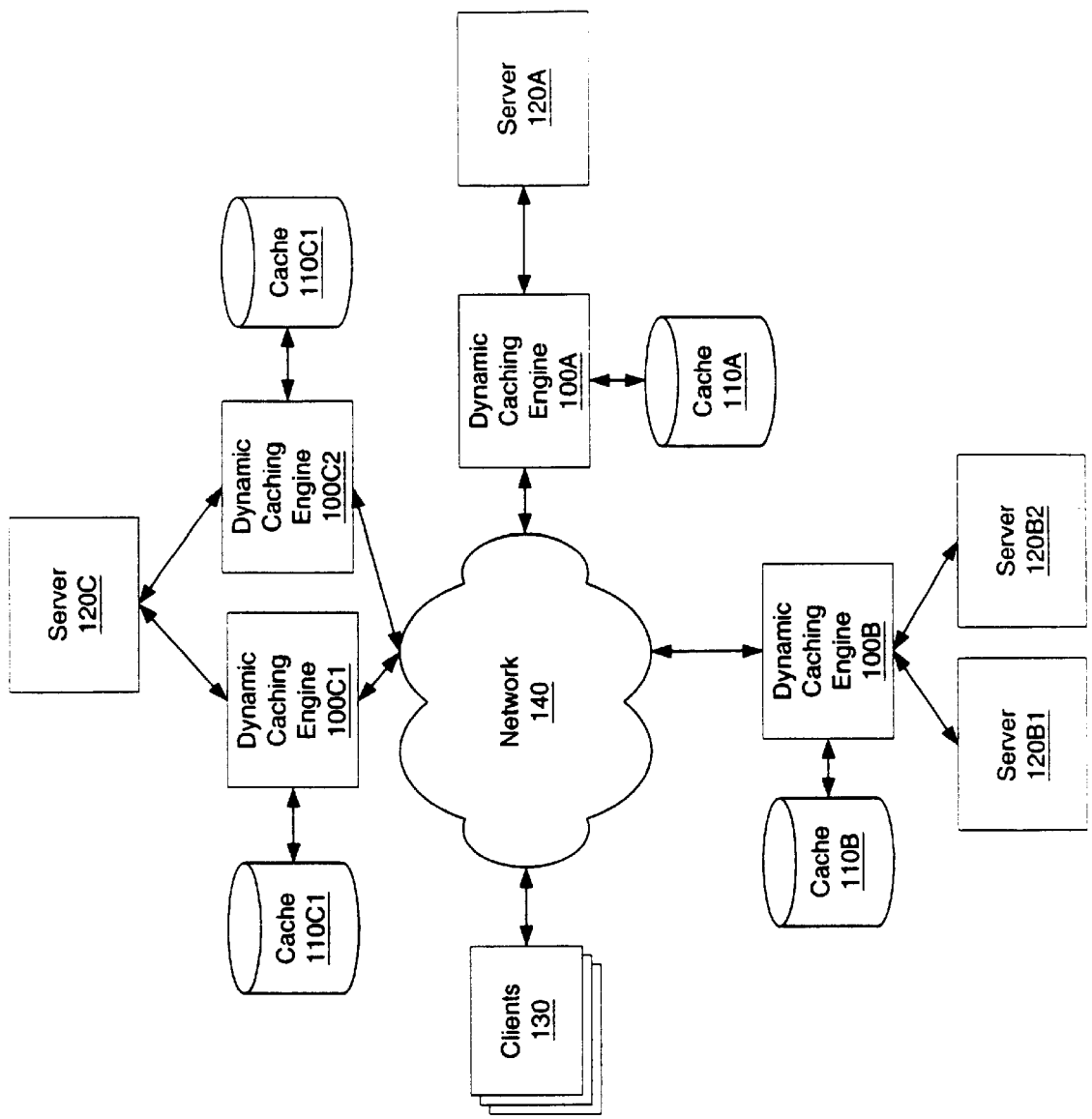
FIG. 1A is a block diagram of a network that may be used with the present invention.

FIG. 1A is block diagram illustrating a network including some embodiments of the present invention. The network includes data object servers 120A–C and associated dynamic application cache servers that comprise dynamic caching engines 100A–C.

As shown, the network includes clients 130, which are coupled to network 140. In an embodiment, clients 130 are computing devices, such as client computers. For example, clients 130 can include a number of different notebook or desktop computers, and network 140 comprises the Internet. In an alternative embodiment, network 140 comprises an Intranet, a local area network (LAN), a wide area network (WAN), or an alternative network.

Additionally, a dynamic caching engine 100 is also coupled to network 140, while data object server 120 is coupled to dynamic caching engine 100. The dynamic caching engine 100 is made up of one or more dynamic application cache servers. Accordingly, in an embodiment, communications between clients 130 and data object server 120 pass through a dynamic application cache server. As will be described in more detail below, in an embodiment, a cache 110 associated with dynamic caching engine 100 stores a representation of a data object that is stored in the data object server 120. In one such embodiment, the representation of the data object includes data and logic describing the data object. Thus, when the data object is requested, the data object can be reconstructed and served to a requesting device, such as client 130, based on this data and logic. Moreover, in one embodiment, dynamic caching engine 100 stores a time-to-live period or expiration time for the data object. Accordingly, if the data object is being requested from data object server 120 by a client 130, and a valid representation of this data object is stored in cache 110, dynamic caching engine 100 transmits the reconstruction of the data object to the requesting device 130 without retrieving the data object from data object server 120. This decreases the load on data object server 120.

While different embodiments of the present invention may have different types of communication protocols among clients 130, dynamic caching engine 100, and data object server 120, in an embodiment, the communication protocol is the Hyper Text Transfer Protocol (HTTP). Moreover, in one such embodiment, the communication protocol is upgraded to Secure-HTTP (HTTPS) to allow for increased security.

In one embodiment, network 140 is a local area network (LAN). In another embodiment, network 140 is a wide area network (WAN). In one embodiment, network 140 is the Internet. Further, network 140 can be a combination of different networks that provide communication among clients 130, dynamic caching engine 100 and data object server 120. Moreover, to allow for increased security virtual private networks (VPNs) can be established between a given device 130, 120 and dynamic caching engine 100.

In one embodiment, a dynamic application cache server 100A is coupled to cache 110A. For one embodiment, a dynamic cache server 100A may comprise multiple servers. These servers may perform load balancing. For one embodiment, multiple dynamic caching engines 100C1, 100C2 may be coupled to a cache 110. For another embodiment, multiple caches 110 may be coupled to a single dynamic caching engine 100. For another embodiment, multiple dynamic caching engines 100C1, 100C2 may be coupled to a single server 120C. In that instance, for one embodiment, cache coherency is provided for by dynamic caching engine 100C1, 100C2, as will be described in more detail below. Alternatively, a single dynamic caching engine 100B may serve multiple servers 120B1, 120B2.

Figure 1B:
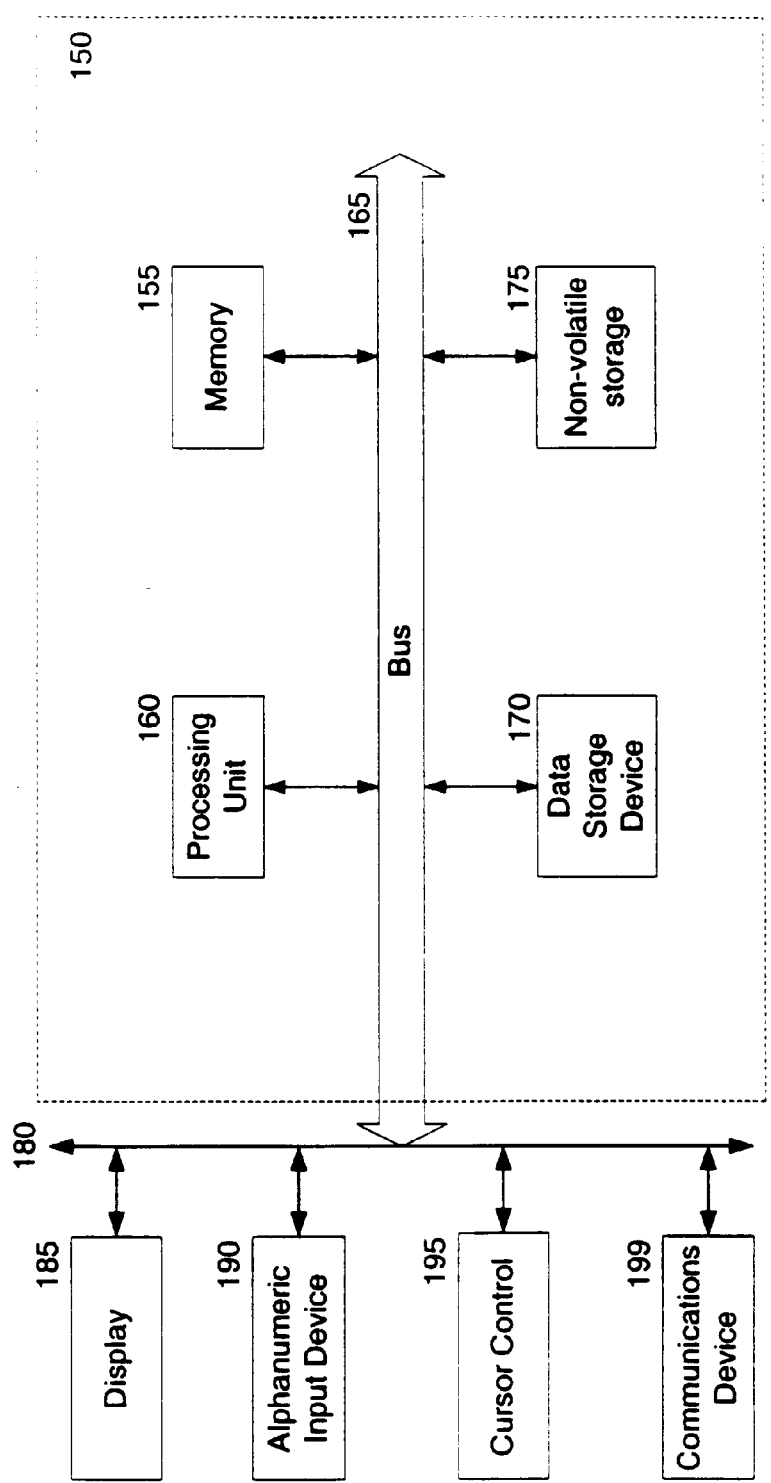
FIG. 1B is a block diagram of one embodiment of a computer system.

FIG. 1B illustrates a block diagram of a computer system that may be used with the present invention, according to one embodiment of the present invention. Although described in the context of a computer system 150, the present invention may be implemented in any suitable computer system. It will be apparent to those of ordinary skill in the art that alternative systems of various system architectures may also be used.

The data processing system illustrated in FIG. 1B includes a bus or other internal communication means 165 for communicating information, and a processor 160 coupled to the bus 165 for processing information. The system further comprises a random access memory (RAM) or other volatile storage device 155 (referred to as memory), coupled to bus 165 for storing information and instructions to be executed by processor 160. Main memory 155 also may be used for storing temporary variables or other intermediate information during execution of instructions by processor 160. The system also comprises a read only memory (ROM) and/or static storage device 175 coupled to bus 165 for storing static information and instructions for processor 160, and a data storage device 170 such as a magnetic disk or optical disk and its corresponding disk drive. Data storage device 170 is coupled to bus 165 for storing information and instructions.

The system may further be coupled to a display device 185, such as a cathode ray tube (CRT) or a liquid crystal display (LCD) coupled to bus 165 through bus 180 for displaying information to a computer user. An alphanumeric input device 190, including alphanumeric and other keys, may also be coupled to bus 165 through bus 180 for communicating information and command selections to processor 160. An additional user input device is cursor control device 195, such as a mouse, a trackball, stylus, or cursor direction keys coupled to bus 165 through bus 180 for communicating direction information and command selections to processor 160, and for controlling cursor movement on display device 185.

Another device, which may optionally be coupled to computer system 150, is a communication device 199 for accessing other nodes of a distributed system via a network. The communication device 199 may include any of a number of commercially available networking peripheral devices such as those used for coupling to an Ethernet, token ring, Internet, or wide area network. The communication device 199 may further be a null-modem connection, or any other mechanism that provides connectivity between the computer system 150 and the outside world. Note that any or all of the components of this system illustrated in FIG. 1B and associated hardware may be used in various embodiments of the present invention.

It will be appreciated by those of ordinary skill in the art that any configuration of the system may be used for various purposes according to the particular implementation. The control logic or software implementing the present invention can be stored in main memory 155, mass storage device 170, or other storage medium locally or remotely accessible to processor 160.

It will be apparent to those of ordinary skill in the art that the system, method, and process described herein can be implemented as software stored in main memory 155 or read only memory 175 and executed by processor 160. This control logic or software may also be resident on an article of manufacture comprising a computer readable medium having computer readable program code embodied therein and being readable by the mass storage device 170 and for causing the processor 160 to operate in accordance with the methods and teachings herein.

The present invention may also be embodied in a special purpose appliance including a subset of the computer hardware components described above. For example, the appliance may include a processor 160, a data storage device 170, a bus 165, and main memory 155, and communications mechanism 199. In general, the more special-purpose the device is, the fewer of the elements need be present for the device to function. In some devices, communications with the user may be through a touch-based screen, or similar mechanism.

It will be appreciated by those of ordinary skill in the art that any configuration of the system may be used for various purposes according to the particular implementation. The control logic or software implementing the present invention can be stored on any machine-readable medium locally or remotely accessible to processor 160. A machine-readable medium includes any mechanism for storing or transmitting information in a form readable by a machine (e.g. a computer). For example, a machine readable medium includes read-only memory (ROM), random access memory (RAM), magnetic disk storage media, optical storage media, flash memory devices, electrical, optical, acoustical or other forms of propagated signals (e.g. carrier waves, infrared signals, digital signals, etc.).

Figure 2:
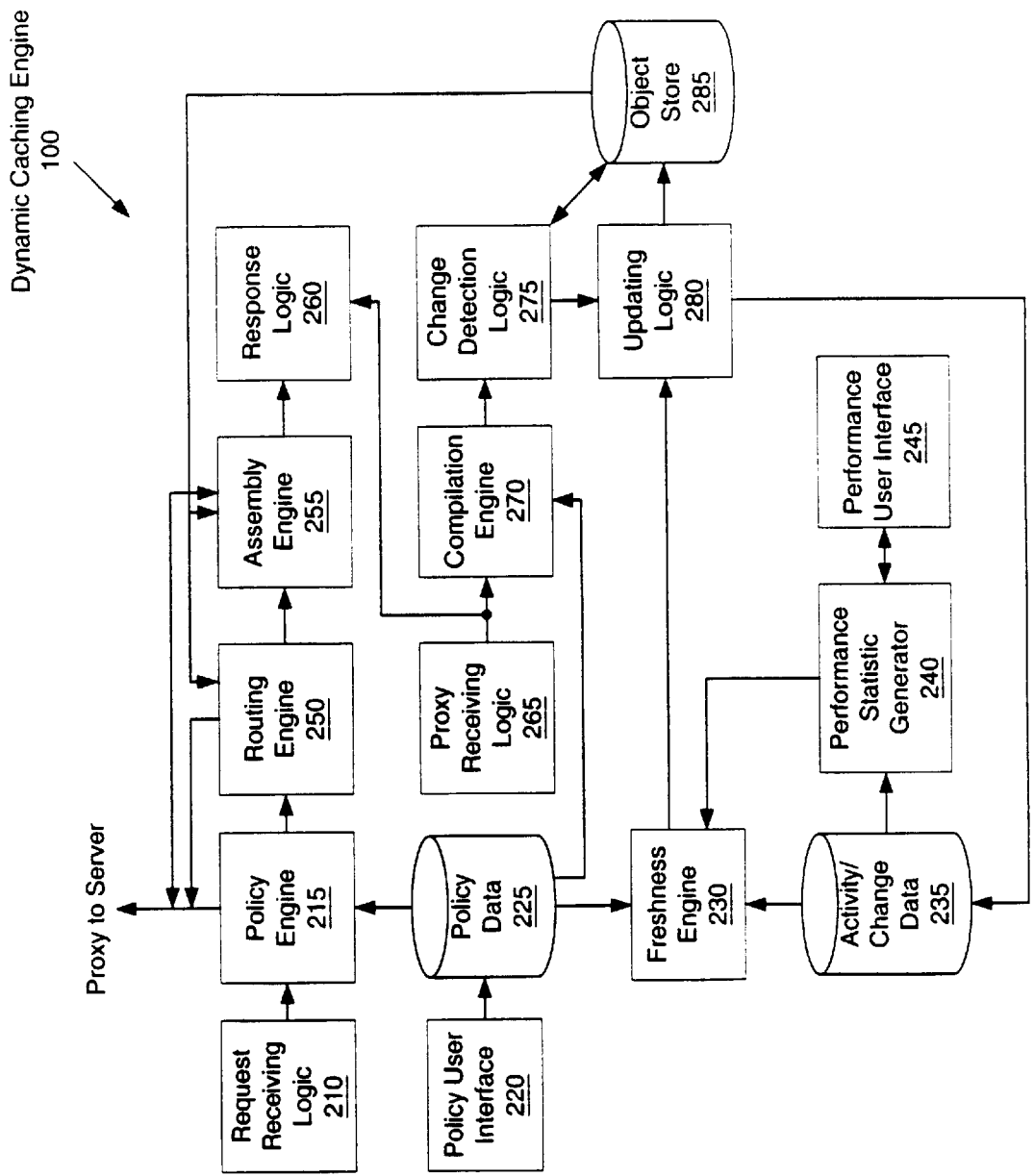
FIG. 2 is a block diagram of one embodiment of the dynamic application caching engine in accordance with the present invention.

FIG. 2 is a block diagram of one embodiment of the dynamic application caching engine in accordance with the present invention. Request receiving logic 210 receives a request from a client. The request is directed at the origin server (not shown), and dynamic caching engine 100 intercepts the request. The request is then passed to policy engine 215, which uses the policy data 225 to determine whether the request can be served by the dynamic caching engine 100. If the request cannot be served, based on policies set by the user using policy user interface 220, the request is proxied to the origin server. If the request can be served, the process continues to the routing engine 250. The routing engine 250 determines whether the requested object is in the cache, and if so, whether the object in the cache is still valid. Validity in this context refers to a data object that has not yet expired (e.g. its time to live is non-zero), and has not been invalidated for another reason, such as a cache flush or policy based invalidation. These concepts are described and discussed in more detail below. If the object in the cache, is valid, the routing engine 250 passes the request to assembly engine 255. Otherwise, the routing engine 250 proxies the request to the server. The assembly engine 255 uses the compile object in object store 285 to recreate the dynamic response for the user, which is then returned to the user by response logic 260. The fact that a request has been served from the cache is then passed to freshness engine 230 for its analysis.

If the request was proxied to the origin server, because it either could not be found in the cache or was not valid, the response from the origin server is received by proxy receiving logic 265. Compilation engine 270 creates a compile object from the response. The compile object includes instructions and data, for one embodiment. The compile object is passed to change detection logic 275. Change detection logic 275 determines whether the new compile object is identical to the expired compile object in the object store 285. Updating logic 280 updates the compile object in the cache. Updating logic 280 also passes the data —e.g. time, whether or not the fetched version was different from the original to activity/change data 235.

Freshness engine 230 uses the policy data 225, as well as activity/change data 235 to create an equation to calculate a time-to-live for the data in the object store 285. The updating logic 280 updates the time-to-live of the compile object. For one embodiment, freshness engine 230 is in an offline server, while the portions of the system that respond to a request are in an online server. The freshness calculation, for one embodiment, is described in copending application Ser. No. 10/143,041 filed concurrently herewith, entitled "Updating Data Objects for Dynamic Applications Caching". Each of these components of the system is described in more detail below.

Figure 3A:
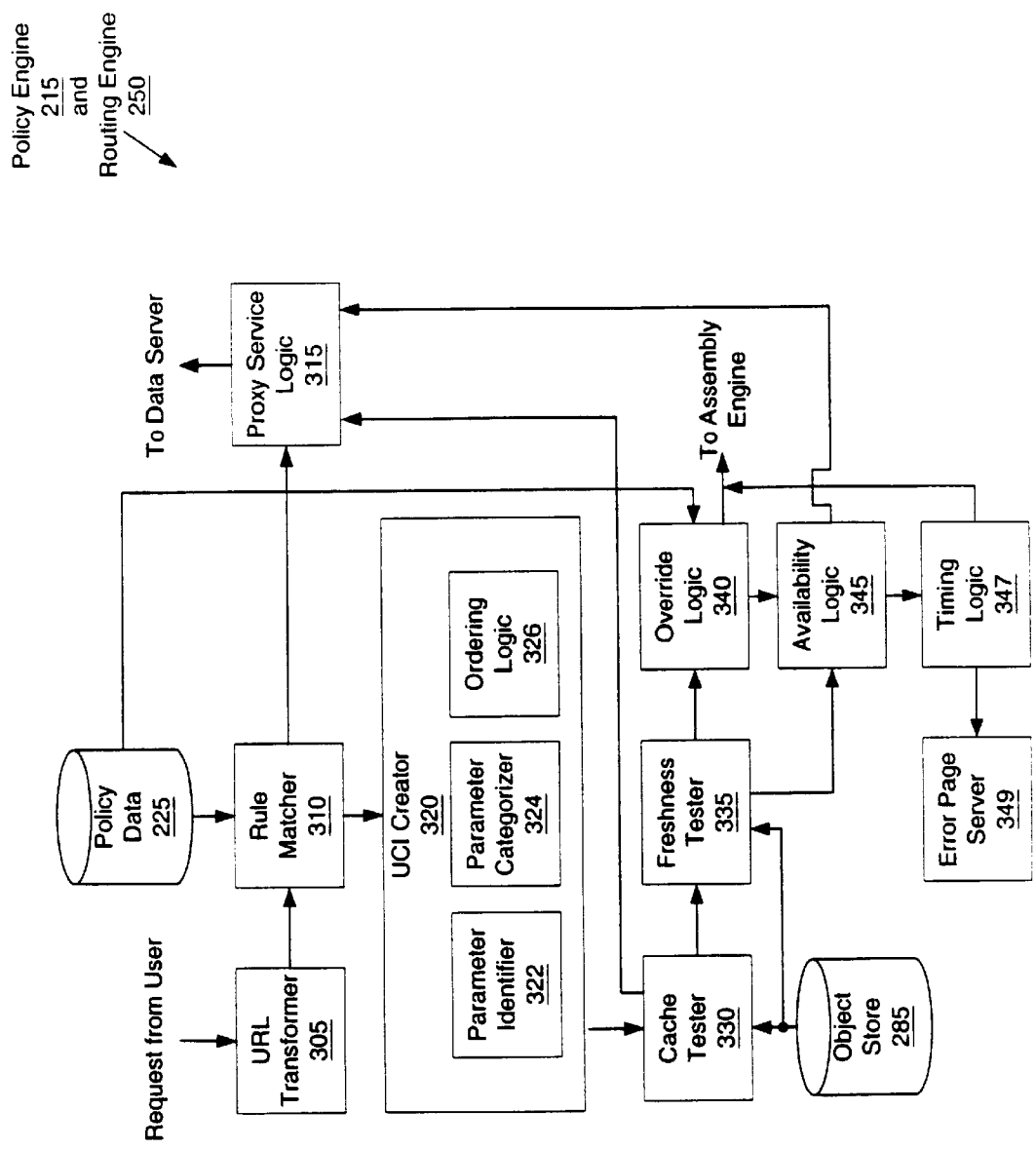
FIG. 3A is a block diagram of one embodiment of the policy and routing engine.

FIG. 3A is a more detailed block diagram of one embodiment of the policy engine and routing engine. The request from user—which was determined by policy engine to be cacheable—is passed to URL transformer 305. The URL (uniform resource locator) transformer 305 transforms the request into a canonical form. The rule matcher 310 determines whether there are any rules in the policy data 225 that prohibits serving the request from the cache. If so, the proxy service logic 315 proxies the request to the origin server.

If the request is cacheable, the UCI (unique content identifier) creator 320 creates a unique identifier for the request. The UCI creator 320 includes a parameter identifier 322, a parameter categorizer 324, and an ordering logic 326. The output of UCI creator is a unique content identifier, which includes all relevant parameters. The relevant parameters are defined by the policy set by the user. For one embodiment, parameters that are missing from the request are included as place-holders.

Figure 10:
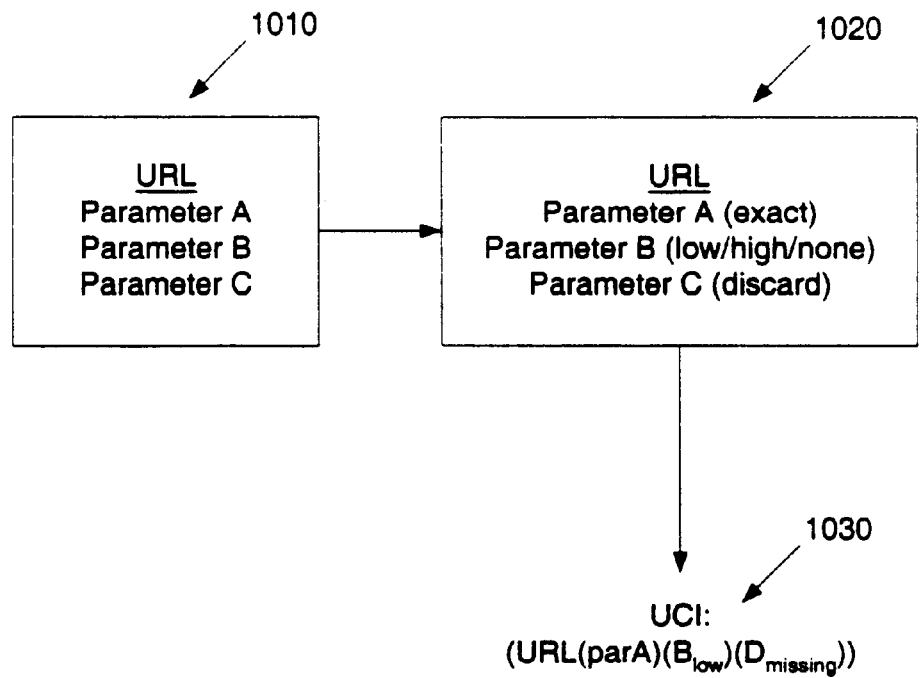
FIG. 10 is an illustration of one embodiment of creating a unique URL.

As shown in FIG. 10, the various parameters, included with the request 1010, are parsed. For example, a response going to a request from the America On-Line (AOL) network may have a different response than one going to a corporate user. In the example, however, corporate users from any corporate interface may receive the same response. Therefore, the parameter identifying the user's originating server may be categorized. Thus, a parameter may be reduced to one of a set of categories. For example, in FIG. 10, the example shows parameter B being categorized as "low," "high," or "none." These categories can be any set of categories. For example, the categories may be "member," "first time guest", "returning guest." Any other set of categories may be defined. These categories are defined by the user, using policy interface.

Certain other parameters may be directly represented. For example, the page on the same site from which the user came may directly affect the displayed information. FIG. 10 illustrates this in parameter A. Certain other parameters may be discarded, as shown with parameter C. And certain parameters may be missing in the original request 1010. However, the UCI 1030 includes a placeholder for the missing parameter, as can be seen with respect to parameter D. This permits the resulting UCI 1030 to have a canonical form, regardless of which parameters were present and missing from the original request 1010.

Returning to FIG. 3A, the UCI, in canonical format, is tested by cache tester 330 to determine whether it can be found in object store 285. If the data from the same UCI has been served in the past, and has not been purged, then it can be found in the object store 285. If the data is not in the cache, the request is passed to the proxy service logic 315, to request the response from the origin server. If the data is in the cache, the request is passed to freshness tester 335. Freshness tester 335 determines whether the data in the object store 285 is fresh. Each data has associated with it a time-to-live or "freshness" value. The data in the object store 285 is considered fresh only for a preset period. For one embodiment, the freshness tester 335 performs a calculation to evaluate the freshness of the object. If the object is not considered fresh, the request is passed to availability logic 345. If the object is fresh, but override logic 340 determines that the data should be served from the origin server, the request passes to availability logic 345.

Override logic 340 determines whether a policy, in policy data 225, overrides the freshness determination of freshness tester 335. If the freshness determination is not overridden, override logic 340 passes the request to assembly engine, to assemble the response based on the content in the object store. Otherwise, the request is passed to availability logic 345.

Availability logic 345 determines whether the origin server is available. Occasionally, the origin server becomes unavailable temporarily. For example, if too many requests are being served from the origin server, it may be unavailable. Alternatively, if the server goes down for any reason, it may be unavailable. If availability logic 345 determines that the origin server is available, it passes the request to proxy service logic 315. Otherwise, it passes the request to timing logic 347.

Timing logic 347 determines whether the data is sufficiently fresh to serve if the origin server is unavailable. For one embodiment, timing logic 347 further uses policies set by the user, to determine whether the request can be served from the (expired) cache. If the request can be served from the cache, timing logic 347 passes the request to assembly engine. Otherwise, timing logic passes the request to error page server 349. Error page server 349 serves an error page. For one embodiment, the error page served may be the expired data with a notification that the data on the page is expired. This means, that if the origin server is down, the requester is not simply served a "404 Page Unavailable" error, but may rather be served an informative page, which may in fact include the data the requester was seeking.

Figure 3B:
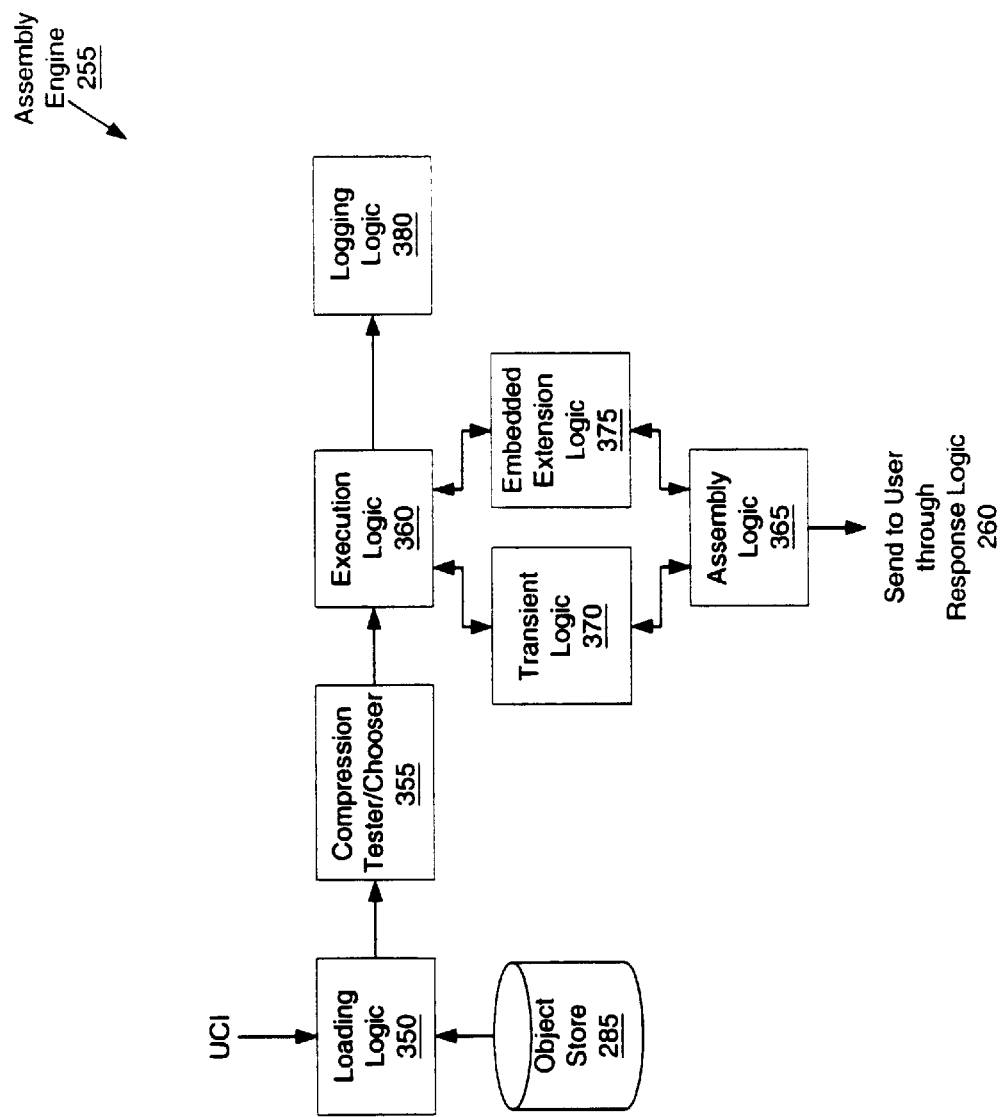
FIG. 3B is a block diagram of one embodiment of the assembly engine and response logic.
Figure 9:
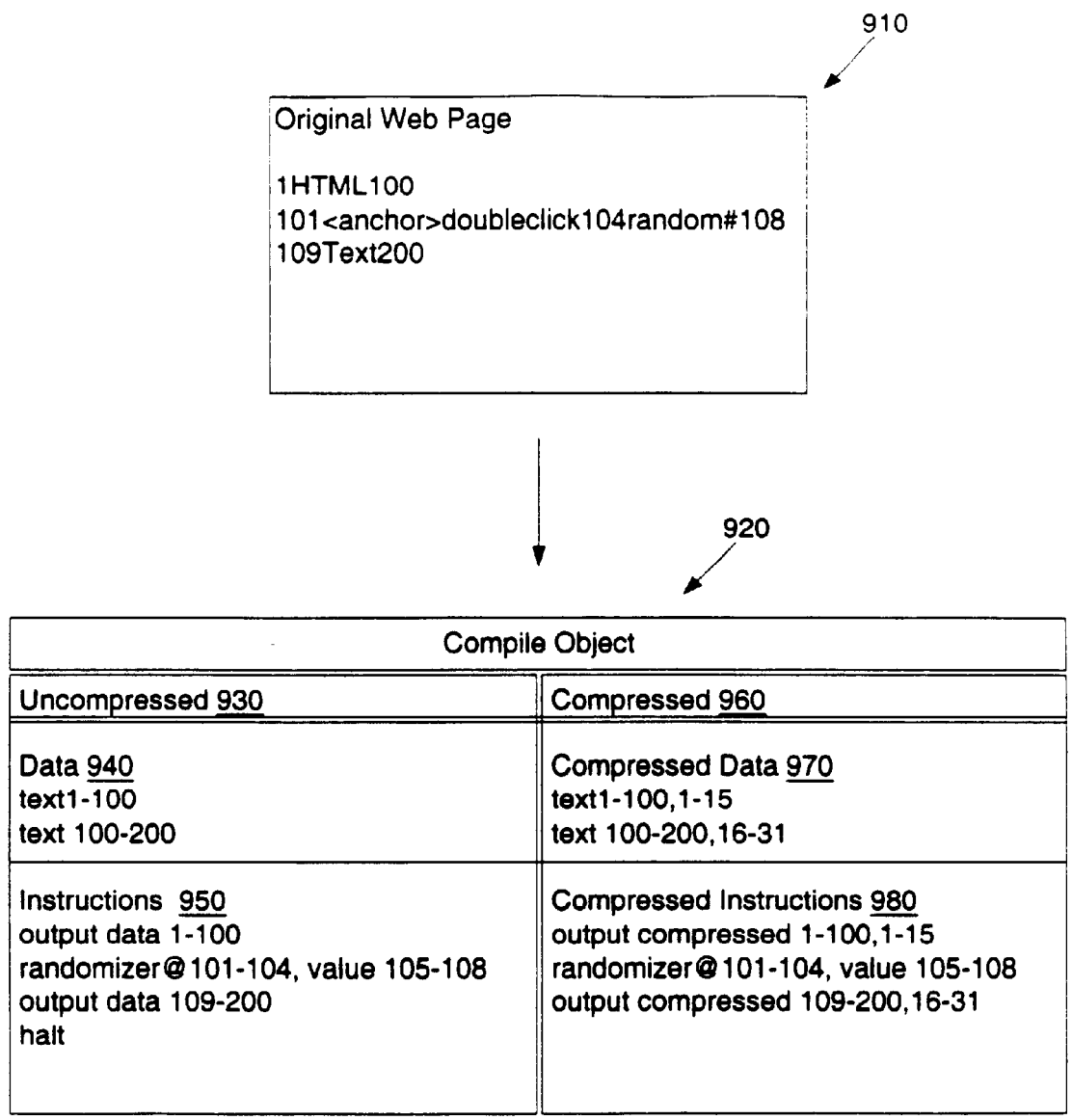
FIG. 9 is an illustration of one embodiment of a compile object

FIG. 3B is a block diagram of one embodiment of the assembly engine and response logic. The loading logic 350 receives the UCI from the routing engine. The loading logic 350 retrieves the data from the objector store 285. The data is a compile object. FIG. 9 is an illustration of one embodiment of a compile object. As can be seen in FIG. 9, the compile object 920 includes two portions, data 940 and instructions 950. For one embodiment, the compile object 920 may have two elements as well, a compressed element 960 and an uncompressed element 930. Each element 930, 960 includes a data portion 940, 970 and an instruction portion 950, 980. This permits a response to a requester than can accept compressed data, without requiring on-the-fly compression, which is time-consuming. By storing the compressed element 960, the compressed response is served as quickly as an uncompressed response.

Returning to FIG. 3B, the compile object is passed by loading logic 350 to compression tester/chooser 355. Compression tester/chooser 355 determines whether to use the compressed element or the uncompressed element of the compile object. For one embodiment, the compile object may not have both a compressed and uncompressed version. In that case, this element may be removed.

The execution logic 360 executes the instructions of the compile object to reconstruct the response for the requester. The execution logic 360 interacts with transient logic 370 and embedded extension logic 375. Transient logic 370 permits the insertion of data that changes for each user. Transient information may be the random number that identifies each unique response to an advertisement like DoubleClick's, personalization, or other similar transient elements. Embedded extension logic 375 permits the system to comply with the Edge Side Includes (ESI) standard. Furthermore, the embedded extension logic 375 permits the assembly engine to obtain certain elements from the origin server.

This data is passed to the assembly logic 365, which assembles the final response, and sends it to the user, through response logic 260. The assembled response is also sent to logging logic 380. Logging logic 380 logs the time, and other relevant details. These details are used by the freshness engine (not shown) to calculate subsequent freshness equations.

Figure 4:
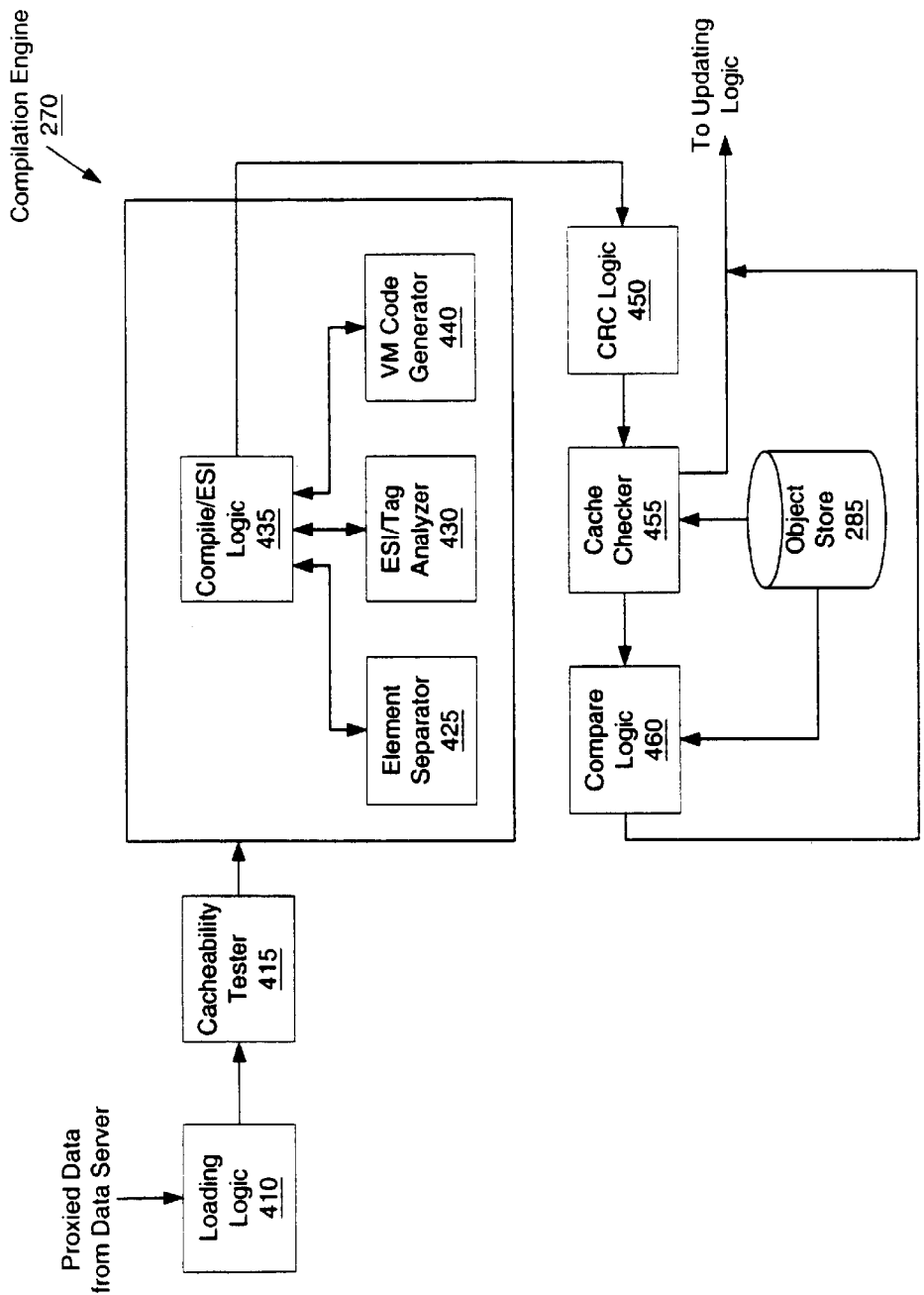
FIG. 4 is a block diagram of one embodiment of the compilation engine.

FIG. 4 is a block diagram of one embodiment of the compilation engine. The compilation engine 270 receives the proxied data returned from the origin server. The loading logic 410 receives the proxied data. Cacheability tester 415 determines whether the returned data can be cached. This is determined using the policies set by the user, and recorded as policy data. For one embodiment, data may be excluded by class—for example pages which request user input or pages which are secure (e.g. HTTPS). Alternatively, pages may be individually excluded, by URL, or some other identification means. If the cacheability tester 415 determines that the page is not cacheable, it is discarded. Otherwise, it is passed on to compilation engine 270.

The compile/ESI logic 435 uses element separator 425, ESI/Tag analyzer 430, and VM code generator 440 to create the compile object from the data. The element separator 425 identifies the elements in the data. These elements include: data, transient elements, personalization, and other elements. Element separator 425 separates the data into multiple elements. VM code generator 440 generates the instructions to put the elements back together. ESI/Tag analyzer 430 recognizes ESI compliant, and other types, of tags. These tags are in the original web page, indicating how to handle each tagged element. One example of these tags is described at www.esi.org. Alternative tags may be set up by the user. The disadvantage of using such tags is that each page must be tagged, and whenever a page is updated, the tags must be updated appropriately. However, the present system does accept such tags.

The output of the compilation engine 270 is passed to CRC logic 450. CRC logic 450 performs a CRC (cyclic redundancy checksum) operation, or similar operation that results in a checksum. For one embodiment, CRC logic 450 creates a 128-bit CRC of the compile object. Note that by using the compile object, which includes instructions and data, the transient elements are automatically excluded from the CRC, and thus do not affect the comparison. Cache checker 455 determines if a copy of the data is already in the cache. If so, it passes the CRC to the compare logic 460. Otherwise, it passes the CRC and compile object to updating logic, to be entered into the object store 285.

The compare logic 460 determines whether the version of the data in the object store 285 has the same CRC as the newly obtained data. For one embodiment, one of the metadata elements associated with the compile object in the object store 285 is the CRC. Thus, the CRC of the compile object in the cache need not be computed at this point. The results of the comparison are passed to updating logic. Updating logic then either updates the version in the object store 285, if the new version is different from the old version, or updates the associated metadata, if the new version is the same as the old version. In this way, the system receives data from the origin server, compiles it to create a compile object, and places a copy of the compile object in the object store 285, if appropriate.

Figure 5:
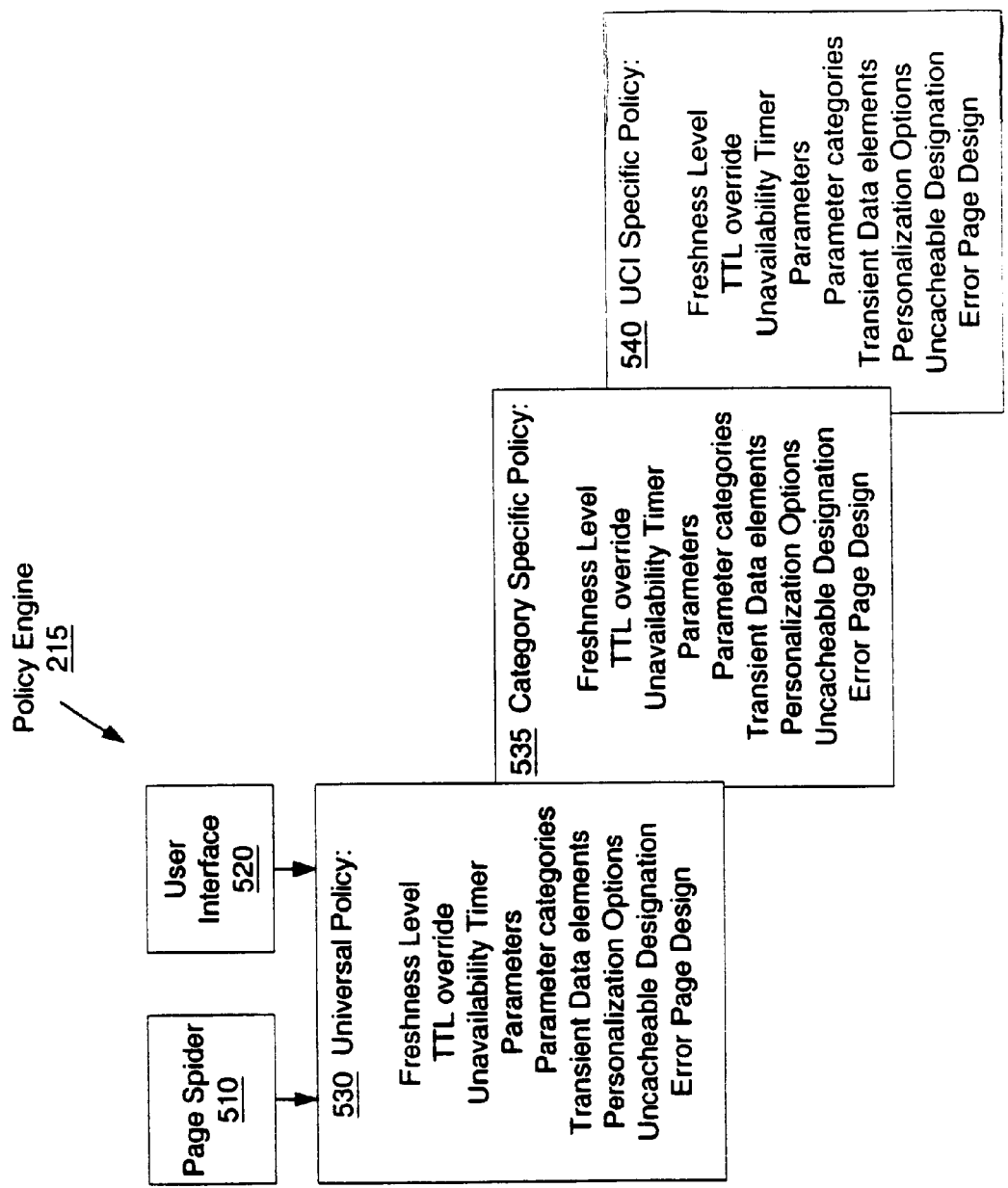
FIG. 5 is a block diagram of one embodiment of the policy engine.

FIG. 5 is a block diagram of one embodiment of the policy engine. The system illustrates how a user may set policies. In general, the user sets a "universal policy" 530 for all pages. For one embodiment, the universal policy 530 may include one or more of the following:

Freshness level: the overall freshness level of data served. This is the goal freshness level used by the freshness engine to calculate time-to-live for various compile objects.

TTL override: the triggers that override the time-to-live attached to compile objects.

Unavailability Timer: a timer indicating how long an expired page should be served, if the origin server is unavailable.

Parameters: this is the list of parameters that are received with a request, in order, such that a constructed UCI has the canonical form.

Parameter categories: certain parameters are categorized, as described above. This identifies those parameters, and the categories for them.

Transient Data Elements: identifies the types of transient data elements that may be present in the data. The transient elements include personalization, randomized elements, cycled elements, etc.

Personalization options: identifies the personalization options. In general, personalization is carried through from the request/cookie associated with the request.

Uncacheable designation: identifies particular pages, portions of pages, types of pages, etc. that are designated uncacheable. May also include identification of a tag, which may be attached to uncacheable pages.

Error page layout: designs an error page, presented when the origin server is unavailable, and the version in the cache is too old to be served. It may include only a "flag" or banner identifying the page as expired data, or it may be a separate design.

In addition to the universal, or default, policy 530, the user may set up category-specific policies 535, for various categories of pages. The categories of pages may be, for example, based on a particular root page. For example, all pages that are descended from the www.pivia.com/ documentation/ root page may be designated as a category having a particular set of rules. Thus, the category-specific policy 535 may be set up. Note that the category-specific policy may simply be to designate pages in the category as "uncacheable." Furthermore, the user may set up UCI specific policies 540, for particular pages. For one embodiment, the user need only specify those parameters that are different for the UCI specific policy 540 from the universal policy 530 and/or the appropriate category-specific policy 535.

Figure 6A:
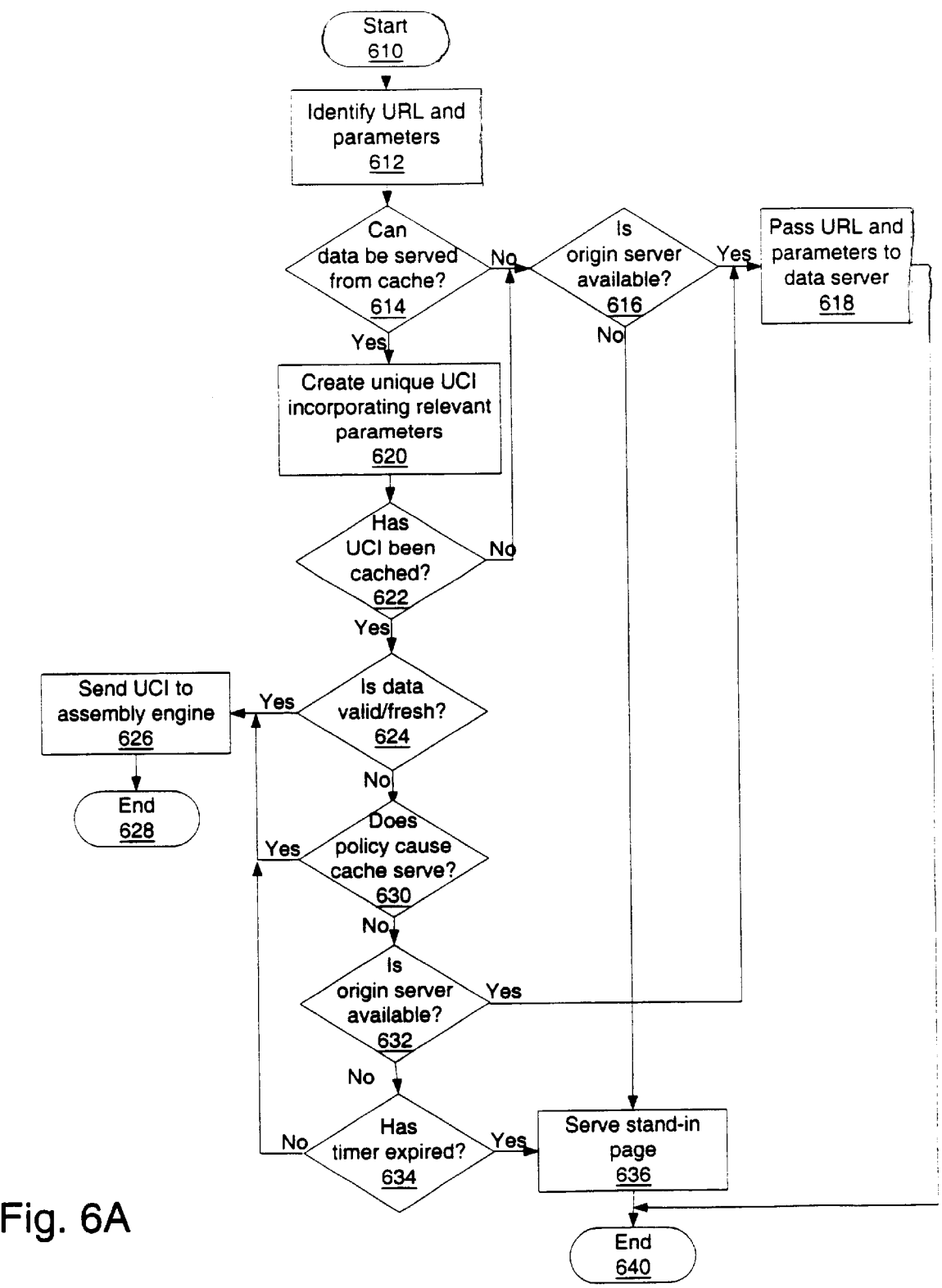
FIG. 6A is a flowchart of one embodiment of routing a request.

FIG. 6A is a flowchart of one embodiment of routing a request. The process starts at block 610, when a request is received from a client. For one embodiment, the request is addressed to the origin server. The dynamic caching system of the present invention intercepts the request destined for the origin server.

At block 612, the URL and its associated parameters are identified. The parameters may be included in the request itself, may be part of a cookie associated with the request, or may be conveyed to the system in another way.

At block 614, the process determines whether the data can be served from the cache. The data may not be served from the cache if the page is designated as uncacheable according to the policy. If the data cannot be served from the cache, the process continues to block 616.

At block 616, the process determines whether the origin server is available. If the origin server is available, the process continues to block 618, and the URL and parameters are passed to the origin server for serving. If the origin server is not available, the process continues to block 636. At block 636, a stand-in page is served. As discussed above, the stand-in page is defined by the policy. The process ten ends at block 640.

If, at block 614, the data was determined to be cacheable, the process continued to block 620. At block 620, a unique UCI is created, incorporating the relevant parameters. As discussed above, the relevant parameters may be a parameter category, a stand-in for a missing parameter, or the parameter itself.

At block 622, the process determines whether the object corresponding to the UCI has been cached. Because the UCI is unique, and consistent across all requests, the system may determine whether the particular UCI has been cached. If it has not been cached, the process continues to block 616, where it determines whether to proxy the request to the origin server or to serve a stand-in page. If the UCI has been cached, the process continues to block 624.

Figure 11:
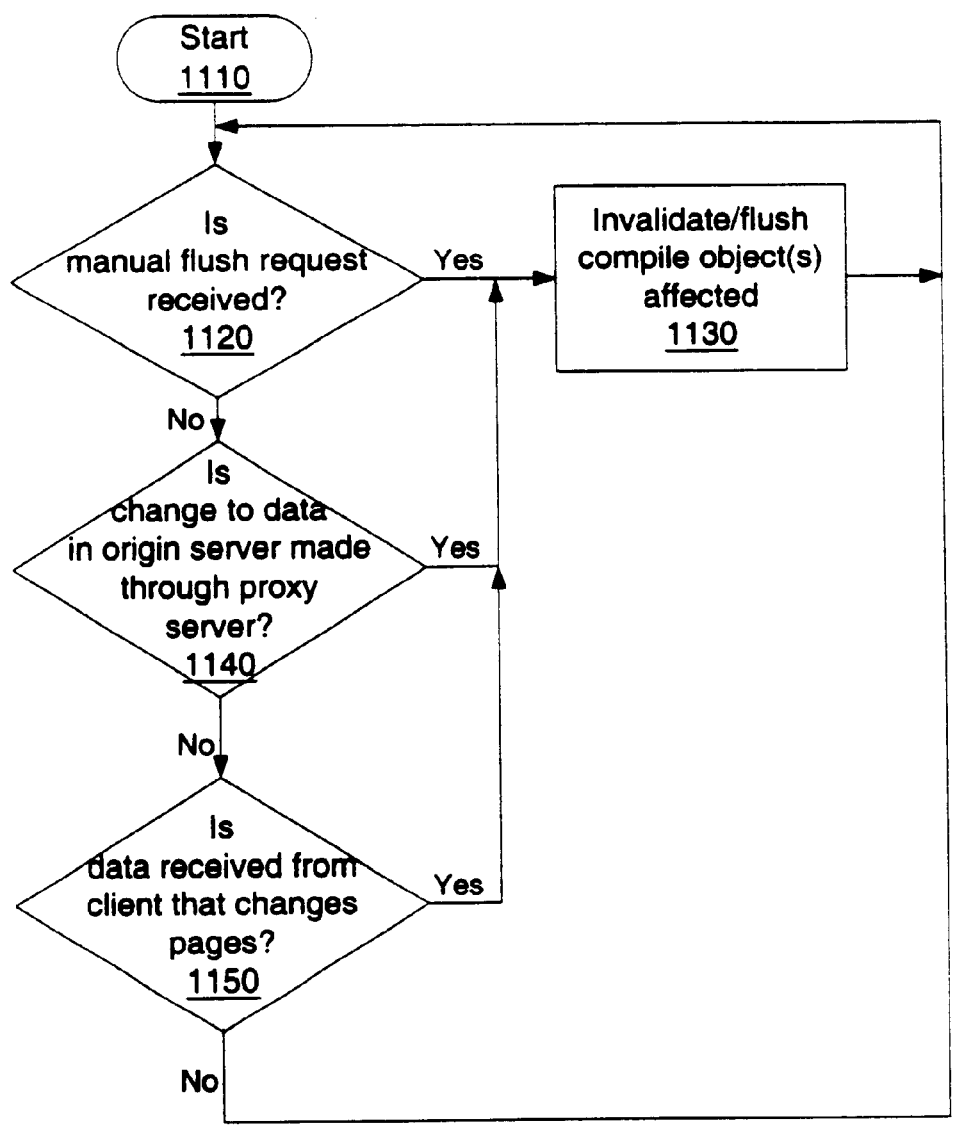
FIG. 11 is a flowchart of one embodiment of using triggers to invalidate compile objects in the cache.

At block 624, the process determines whether the data in the cache is valid/fresh. The data is valid if it has not been invalidated by a triggering event. A triggering event may be a change in the database, a deliberate intervention, or an automatic invalidation, upon the occurrence of certain events. FIG. 11 illustrates examples of such triggering events. The data is considered fresh if the time-to-live period has not yet expired. If the data is valid and fresh, the process continues to block 626. At block 626, the UCI is passed to the assembly engine, to assemble a response to the request. The process then ends at block 628. If the data is either invalid or not fresh, the process continues to block 630.

At block 630, the process determines whether the policy causes a cache serve. The policy may override the validity and/or freshness determination. For example, the policy may state that data that has expired less than 5 minutes ago may be served to users from AOL. Thus, while the TTL may indicate that the data has expired, the policy may override. If the policy causes a cache serve, the process continues to block 626, to send the UCI to the assembly engine. If the policy does not cause a cache serve, the process continues to block 632.

At block 632, the process determines whether the origin server is available. If the origin server is available, the process continues to block 618, to pass the URL to the origin server, for service. If the origin server is unavailable, the process continues to block 634.

At block 634, the process determines whether the unavailability timer has expired. The unavailability timer determines that a stale page may be served for a period of time. The unavailability timer is set by the policy. If the timer has not yet expired, the stale page may be served. Thus, the process continues to block 626, to send the UCI to the assembly engine. If the timer has expired, the process continues to block 636. At block 636, the stand-in page is served, and the process ends, at block 640.

In this way, the present system permits the user's request to be processed by a dynamic caching engine, and either served by the engine or proxied to the origin server for service.

Figure 6B:
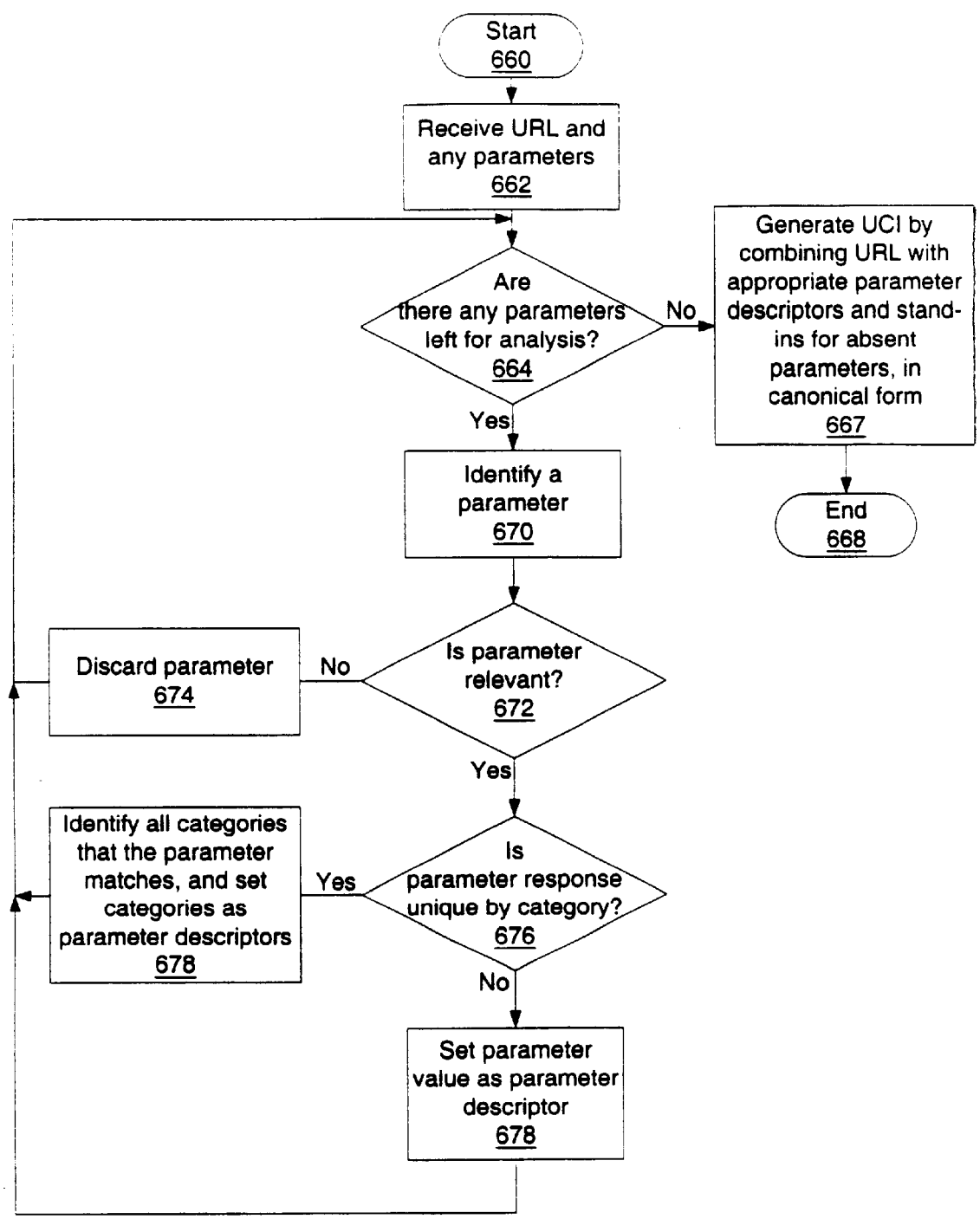
FIG. 6B is a flowchart of one embodiment of creating a unique content identifier (UCI).

FIG. 6B is a flowchart of one embodiment of creating a unique URL (UCI). The process starts at block 660, when a URL and parameters are received. FIG. 6B corresponds to block 620, of FIG. 6A. Returning to FIG. 6B, at block 664, the process determines whether there are any parameters for analysis. If so, the process continues to block 670.

At block 670, the parameter is identified.

At block 672, the process determines whether the parameter is relevant. If not, the process, at block 674, discards the parameter. The process then returns to block 664, to determine whether there are any further parameters for analysis. If the parameter is considered relevant, the process continues to block 676.

At block 676, the process determines whether the parameter is one of the categorized parameters. As discussed above, certain parameters may be treated differently by category. One such parameter may be, for example, the user's ISP. Certain ISPs may be treated differently. For example, a user coming from AOL may be treated differently from a user having at-home DSL. For another example, requests may be categorized by connection speed into slow-modem connection, DSL, and ISDN connections. If the parameter is a categorized parameter, the process continues to block 678. At block 678, all categories that the parameter matches are identified, and the parameter descriptors are set. The process then returns to block 664, to determine whether there are any additional parameters remaining for analysis.

If the parameter response is not categorized, the process continues to block 678. At block 678, the parameter value is set as the parameter descriptor for the UCI. The process then returns to block 664, to determine whether there are any further parameters to handle.

If, at block 664, the process determines that there are no further parameters to evaluate, the process continues to block 667. At block 667, a unique content identifier (UCI) is generated by combining the appropriate parameter descriptor and stand-ins for parameters that were missing, in a canonical order. Thus, the UCI always has the same form, regardless of the parameters received and the content of the UCI. The process then ends at block 668. As noted above, this description corresponds to "generating a UCI" described above.

Figure 7A:
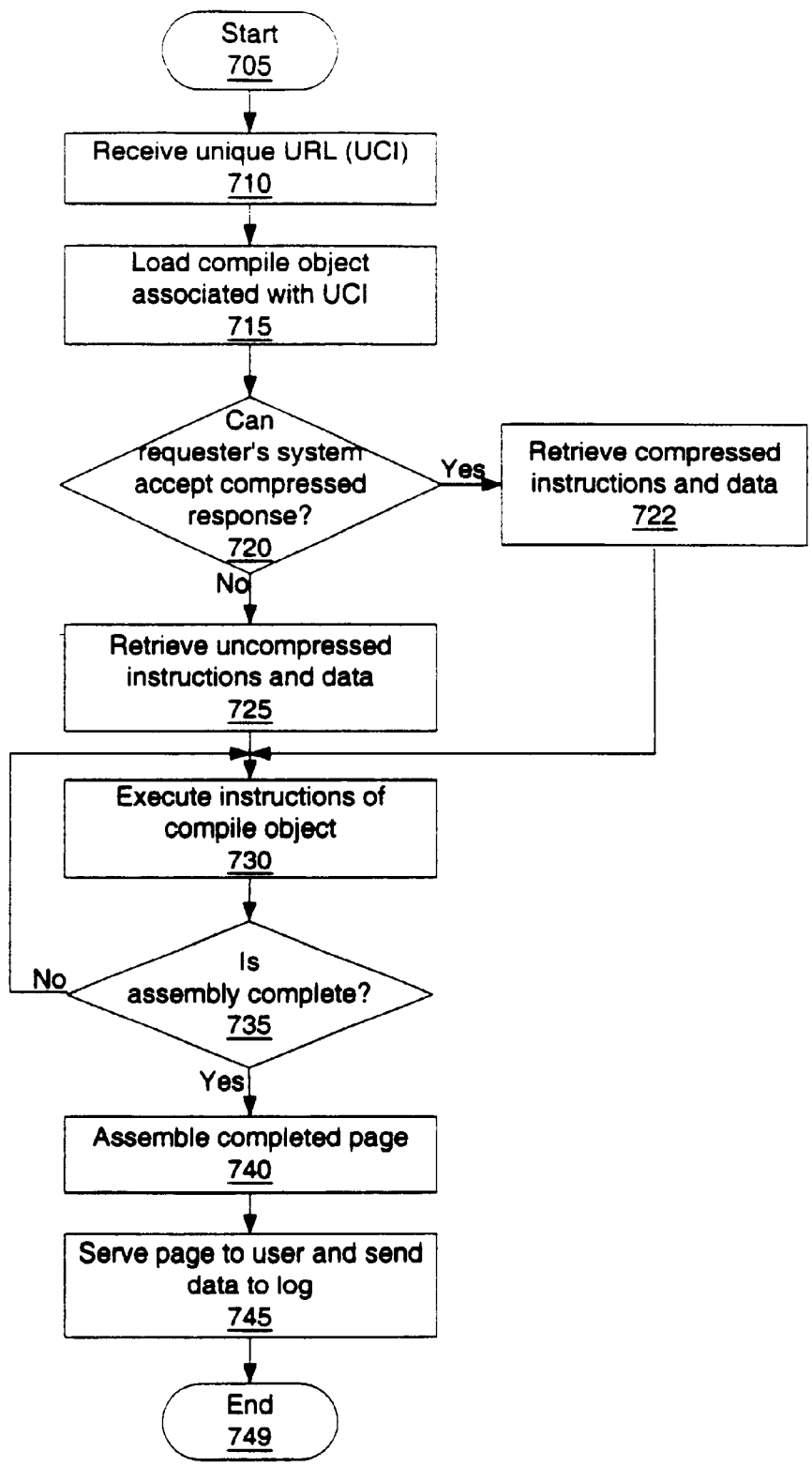
FIG. 7A is a flowchart of one embodiment of assembling a response to serve dynamic content to a user.

FIG. 7A is a flowchart of one embodiment of assembling a response to serve dynamic content to a user. For one embodiment, this process takes place in the assembly engine 255, as shown in FIG. 2. The process starts at block 705. This process is initiated when the system determines that the response to the request should be served from the object store/cache.

At block 710, the UCI is received. At block 715, the compile object associated with the UCI is loaded from the object store.

At block 720, the process determines whether the requester's system can accept a compressed response. Some browsers and systems can decompress content on the fly. If the requester's system can accept compressed content, at block 722, the compressed instructions and data of the compile object are retrieved. The process then continues to block 730. If the requester's system cannot accept compressed content, at block 725, the uncompressed instructions and data are retrieved. The process then continues to block 730.

Figure 7B:
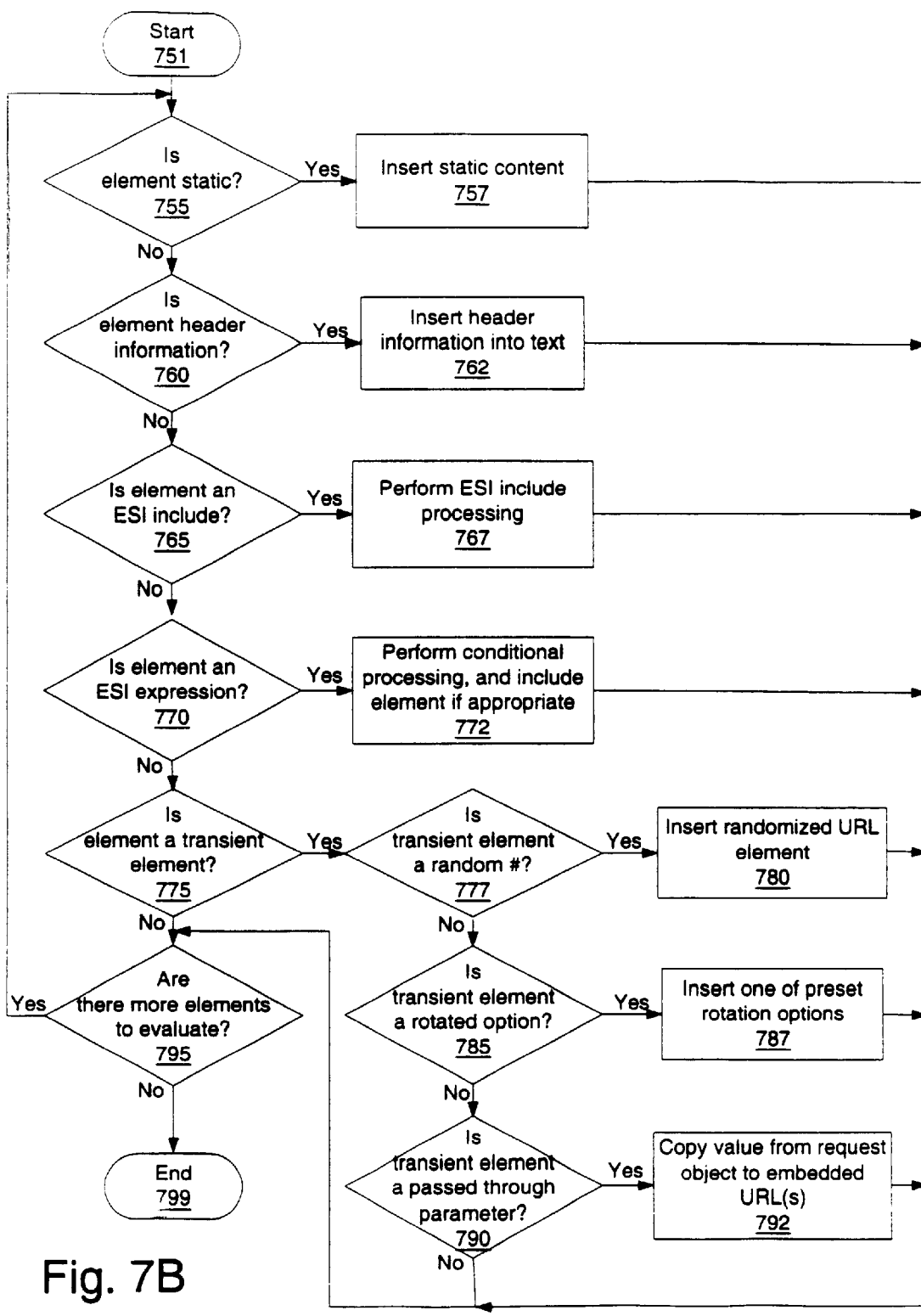
FIG. 7B illustrates one embodiment of executing the instructions of the compile object.

At block 730, the instructions of the compile object are executed. FIG. 7B illustrates one embodiment of the details of executing the instructions of the compile object.

At block 735, the process determines if the assembly is complete. If not, the process returns to block 730, to continue executing instructions. If the assembly is complete, the process continues to block 740.

At block 740, the completed page is assembled. At block 745, the page is served to the user. A copy of the page is sent to the log. The log, for one embodiment, tracks the number of requests for the page. This is used by the freshness engine, to calculate future time-to-live information. For one embodiment, the log includes the UCI, the time of the request, and the time of the response. The process then ends at block 749.

FIG. 7B illustrates one embodiment of executing the instructions of the compile object. The process starts at block 751. This process corresponds to block 730 of FIG. 7A, the execution of the instructions of the compile object.

At block 755, the process determines whether the element is static. If so, the process, at block 757 inserts the static content into the appropriate location. The process then continues to block 795. At block 795, the process determines whether there are any additional instructions/elements to execute. If so, the process returns to block 755, to evaluate the next element. If, at block 755, the element was found not to be a static element, the process continues to block 760.

At block 760, the process determines whether the element is header information. If so, the process, at block 762, inserts the header information appropriately. Header information provides formatting and linking information, for example in the hypertext markup language (HTML) format. The process then continues to block 795, to determine whether there are more elements to evaluate. If, at block 760, the process determined that the element was not header information, the process continues to block 765.

At block 765, the process determines whether the element is an "ESI include." An ESI include provides the ability to fetch and include files to comprise a page, with each file subject to its own configuration and control, its own specified time-to-live in cache, revalidation instructions, and so forth. Included documents can include ESI markup for further ESI processing. The ESI processing may be recursive. If the element is an ESI include, at block 767, the ESI include processing is preformed. The ESI include processing inserts additional instructions by reference. The ESI include may cause the execution of another compile object, or the proxying of additional data from the origin server. In general, an ESI include can invoke any action. This process is, for one embodiment, in compliance with the ESI specification, as provided at www.esi.org. The process then continues to block 795, to determine whether there are additional elements to evaluate. If, at block 765, the element was determined not to be an ESI include, the process continues to block 770.

At block 770, the process determines whether the element is an ESI expression. An ESI expression is any expression supported by the ESI standard. If the element is an ESI expression, at block 772, the ESI expression processing is preformed. The process then continues to block 795, to determine whether there are additional elements to evaluate. If, at block 770, the element was determined not to be an ESI include, the process continues to block 775.

At block 775, the process determines whether the element is a transient element. If so, the process continues to block 777. Otherwise, the process continues to bock 795, to determine whether there are any additional elements to evaluate. If there are no additional elements to evaluate, the process ends at block 799.

If the element, at block 775, was identified as a transient element, the process continues to block 777.

At block 777, the process determines whether the transient element is a random number. Certain advertisements, such as doubleclick's banner ads, include a random number in the URL. If the transient element is a random number, then the random element is inserted at block 780. The process then continues to block 795, to determine whether there are more elements to evaluate. Otherwise, the process continues to block 785.

At block 785, the process determines whether the transient element is a rotated option. Rotated options are, for example, certain advertisements that are rotated (e.g. there are 10 different advertisements, and each is displayed 1 time out of 10.) If the transient element is a rotated option, at block 787, the appropriate rotated option is inserted. For one embodiment, the user may, through policy interface, identify the options to be displayed. For another embodiment, the system collects the options until all options are in the cache. The process then continues to block 795, to determine whether there are more elements to evaluate. Otherwise, the process continues to block 790.

At block 790, the process determines whether the transient element is a pass-through parameter. If so, at block 792, the value of the transient parameter is coped from the request object to the embedded URLs. The process then continues to block 795, to determine whether there are more elements to evaluate.

The above examples of element processing are provided as examples of a larger concept. Specifically, the concept is that each element of a page is processed. Furthermore, for one embodiment, the process separates out transient elements. This permits the caching of dynamic but non-transient content, letting the dynamic cache reduce the load on an origin server.

Figure 8A:
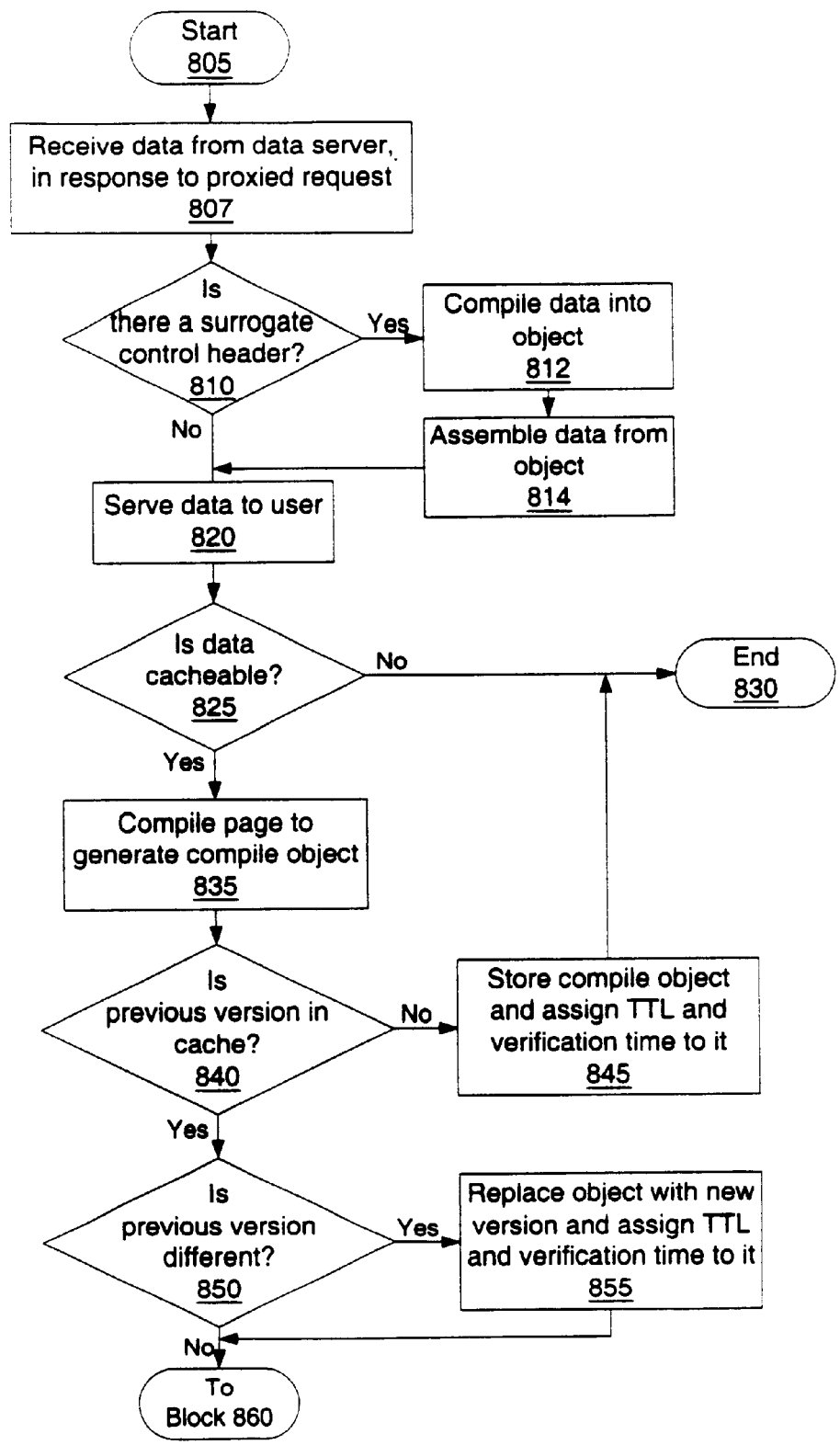

FIGS. 8A and 8B are flowcharts of one embodiment of handling data served by the data server. This process, for one embodiment, is executed in compilation engine 270, of FIG. 2. The process starts at block 805. At block 807, the data requested by the user is received by the dynamic cache engine.

At block 810, the process determines whether there is a surrogate control header. A surrogate control header indicates that the web page is being served requires compilation. If there is a surrogate control header, the process continues to block 812.

At block 812, the data is compiled, to generate a compile object. At block 814, the object is assembled to reconstruct a completed page. Then, at block 820, the data is served to the user. If there is not a surrogate control header, the process continues directly to block 820, and the data is served to the user.

At block 825, the process determines whether the data is cacheable. The cacheability of the data, as discussed above, is determined based on the policies set by the user. If the data is not cacheable, the process ends at block 830. If the data is cacheable, the process continues to block 835.

At block 835, the page is compiled to generate a compile object, if that was not already done at block 812. The compile object is the instructions and data that are used to reconstruct the page. The compile object is discussed above with respect to FIG. 9.

At block 840, the process determines whether a previous version of the same compile object can be found in the server. If no previous version is in the server, the process continues to block 845. At block 845, the process stores the compile object, and assigns a TTL (time-to-live period) and verification time (the time at which object was last verified) to it. For one embodiment, a CRC or similar checksum is calculated for the compile object as well, and stored. The process then ends, at block 830.

If the process determines that a copy of the object can be found in the cache, it continues to block 850. At block 850, the process determines whether the previous version in the cache is different from the current version. For one embodiment, it uses a CRC or similar checksum to make this comparison. If the object is different, at block 855, the object in the cache is replaced by the new compile object and a TTL and verification time is assigned to it. The process then continues to block 860. If the previous version is the same as the current version, the process continues directly to block 860.

At block 860, the information is logged. For one embodiment, the information that is logged includes the time that the data was requested, and whether or not the version cached was identical to the version newly fetched. This data is used by the freshness engine to determine the percentage of data that was served fresh, and to calculate the time-to-live.

At block 865, shown in FIG. 8B, the time to live and verification time of the compile object in the cache is updated. The time-to-live is calculated by the freshness engine to reach a promised freshness percentage. One example of how such a freshness calculation may be implemented is described in co-pending application Ser. No. 10/143,041. The verification time is set to the current time. The process then ends at block 870.

FIG. 8C is a flowchart of one embodiment of compiling a page to create a compile object. For one embodiment, this process takes place in the compilation engine 270, of FIG. 2. The process starts at block 875. FIG. 8C corresponds to block 835 of FIG. 8A. At block 880, the data in the page is identified. For one embodiment, the data is identified by its HTML tag delimiters. For another embodiment, alternative means of identifying textual and image data may be used.

At block 885, transient elements are identified. As discussed above, these transient elements may be indicated by the user, or may be identified based on format.

At block 890, a set of instructions is created to reconstruct the data and transient elements in the correct format. The instructions are used to properly position and insert data and transient elements into the page.

At block 892, a compressed version of the data and instruction set is created. This permits the dynamic cache engine to serve a compressed version of the information to a user whose browser or interface is capable of decompressing such information. This decreases response time and bandwidth.

At block 895, a checksum of the instructions and data is created. The checksum, for one embodiment, is a 128-bit CRC. This checksum is used to determine whether a copy of the data in the cache is identical to this copy. For one embodiment, this checksum is stored as metadata associated with the compile object, such that it is only calculated once, and need not be calculated again to compare this version with a newer version of the compile object. The process then ends at block 899.

FIG. 11 is a flowchart of one embodiment of using triggers to invalidate compile objects in the cache. This process is continuously running as a detection mechanism, for one embodiment.

At block 1120, the process determines whether a manual flush request has been received. If a manual flush request is received, at block 1130, the compile object(s) that are affected by the flush request are invalidated and/or flushed. Such a manual flush request may be used, for example, if the origin server is updated. For example, if the origin server includes data indicating current catalog contents, a manual flush may be used when the catalog is updated. For one embodiment, this type of interaction may be set up as part of updating the origin server. The process then returns to block 1120, to continue monitoring for flush actions. If no manual flush request is received, the process continues to block 1140.

At block 1140, the process determines whether anyone associated with the origin server has made a change to the data, for example to a database. In one embodiment, the database change may prompt a database trigger that notifies the dynamic caching engine of the change. In that case, the process continues to block 1130, to invalidate/flush the relevant compile object(s). If no data change is detected at block 1140, the process continues to block 1150.

At block 1150, the process determines whether data received through the web interface affects a page. As web browsers become the front-end of more and more applications, the web may be used to update the contents of the origin server. In that instance, the dynamic caching engine remains interposed between the requester and the origin server. Thus, the dynamic caching engine can initiate an automated flush operation, if a change is made to the contents of the origin server. Therefore, if an administrator makes a change to the underlying data through the web interface, the dynamic caching engine can initiate a flush operation. Alternatively, the data may be received from a client system. This may occur, for example in an auction. If the user submits a bid, then the cached page indicating the previous price is out-of-date. Therefore, if such data input is identified, the process continues to block 1130, and automatically flushed/invalidates the cache. The process then returns to block 1120, to continue monitoring. If no data change is detected at block 1140, the process returns to bock 1120, to continue monitoring for flush operations.

Although the above processes are described in terms of flowcharts, the particular order of many of the processes may be altered and reversed. One skilled in the art would be able to determine which processes are dependent on order, and which may be executed in any order.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method of dynamically caching data, the method comprising:
   creating a unique content identifier for a requested data set;
   retrieving the requested data set from an origin server;
   creating a compile object of the requested data set; and
   on a subsequent request for the requested data set, assembling the compile object to reconstruct the requested data set, and serving the requested data set to a requester, without impacting the origin server.

2. The method of claim 1, further comprising:
   determining if the compile object for the requested data set already exists in the cache; and if so
   determining if the copy in the cache is fresh; and
   if the copy in the cache is fresh, assembling the compile object and serving the requested data set to the requester.

3. The method of claim 2, further comprising:
   if the copy in the cache is not fresh,
   fetching a new copy of the requested data set from the origin server;
   creating a compile object of the new copy;
   comparing the new copy to the copy in the cache; and
   replacing the copy in the cache if the new copy is different from the copy in the cache.

4. The method of claim 3, further comprising:
   updating a time-to-live of the copy in the cache.

5. The method of claim 4, further comprising:
   determining a freshness of the data served to the requesters;
   comparing the freshness of the data served to an overall freshness level set by a policy of the origin server; and
   generating a new time-to-live based on a deviation from the overall freshness level, to achieve the overall freshness level set by the policy.

6. The method of claim 3, further comprising:
   creating a cyclic redundancy check (CRC) of the compile object of the new copy; and
   comparing the CRC of the compile object of the new copy to a CRC of the copy in the cache, wherein the CRC of the copy in the cache is stored in the cache, and is not newly calculated.

7. The method of claim 1, wherein the compile object comprises:
   a set of instructions and a set of data, the set of instructions indicating where to display the data.

8. The method of claim 7, wherein the set of instructions further permit incorporation of data from the origin server.

9. The method of claim 7, wherein the set of instructions further permit the generation of personalized data, based on parameters in the original request.

10. The method of claim 7, wherein the set of instructions further permits the generation of transient data, unique for each response.

11. The method of claim 7, wherein the compile object further comprises:
    a compressed set of instructions and a compressed set of data, the compressed set of instructions and data used for systems that can process compressed data.

12. The method of claim 1, further comprising:
    permitting the origin server administrator to set policies, the policies including one or more of the following: a level of freshness, and cacheability of various data sets, TTL override, unavailability timer, parameters, parameter categories, transient data elements, personalization options, uncacheability designation, and error page layout.

13. The method of claim 12, further comprising:
    prior to reconstructing the compile object, determining whether the requested data set is cacheable in accordance with the policy, and if so, creating the compile object.

14. The method of claim 1, wherein the unique content identifier comprises a URL and set of parameters in canonical format.

15. An apparatus for dynamic caching comprising:
    a UCI creator to create a unique content identifier for a request for a requested data set;
    a proxy receiving logic to receive the requested data set from the origin server;
    an assembly engine to create a compile object from the requested data set;

a compilation engine to, on a subsequent request for the data set, assemble the compile object to reconstruct the requested data set; and a response logic to serve the requested data set to a requester, without impacting the origin server.

16. The apparatus of claim 15, further comprising:

a cache tester to determine if the compile object for the requested data set already exists in the cache; and if so a freshness tester to determine if the copy in the cache is fresh; and if the copy in the cache is fresh, the assembly engine to reconstruct the compile object and serve the requested data set to the requester.

17. The apparatus of claim 16, further comprising:

if the copy in the cache is not fresh,
- a proxy service logic to fetch a new copy of the requested data set from the origin server;
- the compilation engine to create a compile object of the new copy;
- a change detection logic to compare the new copy to the copy in the cache; and
- an updating logic to replace the copy in the cache if the new copy is different from the copy in the cache.

18. The apparatus of claim 17, further comprising:

a freshness engine to update a time-to-live of the copy in the cache.

19. The apparatus of claim 18, further comprising:

the freshness engine to determine a freshness of the data served to the requesters and comparing the freshness of the data served to an overall freshness level set by a policy of the origin server, and generate a new time-to-live based on a deviation from the overall freshness level, to achieve the overall freshness level set by policy data set by an administrator.

20. The apparatus of claim 17, further comprising:

the change detection logic to create a cyclic redundancy check (CRC) of the compile object of the new copy and compare the CRC of the compile object of the new copy to a CRC of the copy in the cache, wherein the CRC of the copy in the cache is stored in the cache, and is not newly calculated.

21. The apparatus of claim 15, wherein the compile object comprises:

a set of instructions and a set of data, the set of instructions indicating how to display the data.

22. The apparatus of claim 21, wherein the set of instructions further permits one or more of the following: incorporation of data from the origin server, generation of personalized data, based on parameters in the original request, and generation of transient data, unique for each response.

23. The apparatus of claim 21, wherein the compile object further comprises:

a compressed set of instructions and a compressed set of data, the compressed set of instructions and data used for systems that can process compressed data.

24. The apparatus of claim 15, wherein the UCI creator comprises:

a parameter identifier to identify parameters including absent parameters; and an ordering logic to generate a UCI including the original request and relevant parameters in canonical order.

25. The apparatus of claim 24, wherein the UCI creator further comprises a parameter categorizer to replace a parameter with a parameter category.

26. The apparatus of claim 15, further comprising:

a policy user interface to permit an origin server administrator to set policies, the policies including one or more of the following: a level of freshness and cacheability of various data sets, TTL override, unavailability timer, parameters, parameter categories, transient data elements, personalization options, uncacheability designation, and error page layout; and a rule matcher to enforce the policies set by the administrator.

27. The apparatus of claim 26, further comprising:

a policy engine to determine whether the requested data set is cacheable in accordance with the policy, prior to the assembly engine creating the compile object.

28. A dynamic caching server interposed between a client and an origin server, the dynamic caching server comprising:

an inline server to intercept requests from the client to the origin server, the inline server comprising:
- a cache including a plurality of compile objects, each compile object representing dynamic web content;
- a UCI creator to create a unique content identifier for a request, the UCI associated with a compile object;
- an assembly engine to reconstruct the compile object to create the requested data set in response to the request; and
- a response logic to serve the requested data set to a requester, without impacting the origin server.

29. The dynamic caching server of claim 28, further comprising:

an offline server to calculate a time-to-live function for the compile object in the cache, based on a freshness ratio.

30. The dynamic caching server of claim 28, further comprising:

a policy interface permitting an administrator of the origin server to set preferences for the dynamic caching engine, the preferences used by the offline server to set freshness ratios.

* * * * *